United States Patent [19]

Kotani

[11] Patent Number: 4,847,891
[45] Date of Patent: Jul. 11, 1989

[54] TRANSMISSION INFORMING SYSTEM IN FACSIMILE APPARATUS

[75] Inventor: Matahira Kotani, Nara, Japan

[73] Assignee: Sharp Kabushiki Kaisha, Osaka, Japan

[21] Appl. No.: 17,554

[22] Filed: Feb. 24, 1987

[30] Foreign Application Priority Data

Feb. 24, 1986 [JP] Japan .................. 61-38729
Feb. 24, 1986 [JP] Japan .................. 61-38730

[51] Int. Cl.⁴ .................... H04M 11/00; H04M 11/10
[52] U.S. Cl. ........................................ 379/88; 379/100
[58] Field of Search ........................... 379/100, 88, 67

[56] References Cited

U.S. PATENT DOCUMENTS 4,654,718  3/1987  Sueyoshi ........................ 358/257
4,710,951  12/1987  Itezono ............................ 379/100

FOREIGN PATENT DOCUMENTS 0055659  4/1982  Japan ..................... 379/69
0047366  3/1983  Japan ..................... 379/69
0214367  12/1984  Japan ..................... 379/100

Primary Examiner—Thomas W. Brown
Attorney, Agent, or Firm—Birch, Stewart, Kolasch & Birch

[57] ABSTRACT

A transmission informing system in a facsimile apparatus for automatically notifying via a recorded voice message through a separate telephone that a facsimile transmitting operation has been performed through another telephone after the instant facsimile transmission so that a manual confirmation communication operation after the transmission by the person in charge of the transmission is obviated, thus reducing the work required for effecting a facsimile transmission.

4 Claims, 3 Drawing Sheets

TRANSMISSION INFORMING SYSTEM IN FACSIMILE APPARATUS

BACKGROUND OF THE INVENTION

The present invention relates to a transmission informing system which is capable of automatically notifying the receiving party of a transmission, in accordance with voice information optionally inputted in advance, after the transmitting operation by a facsimile apparatus.

Generally, if the transmission operation property is improved to allow the high-speed electrical transmission to be performed in the conventional facsimile apparatus, it is necessary for the transmitting person to call the other party so as to confirm whether or not the transmission image information has been correctly outputted into the other receiving machine and human participation is necessary for the confirming operation.

SUMMARY OF THE INVENTION

Accordingly, an object of the present invention is to provide a system for notifying that the transmission has been automatically performed through the telephone of the other party after a facsimile transmission.

For the solution of the conventional problems, the transmission informing system in the facsimile apparatus in accordance with the present invention comprises a voice input apparatus (a) for inputting the voice information from outside, a voice analysis code apparatus (b) for analyzing and coding the inputted voice, a voice data storing apparatus (c) for storing the coded voice data, a voice composition output apparatus (d) for composing voice messages in accordance with the stored voice data to output them, an automatic dial apparatus (e) for automatically connecting the circuit with the called station of the number in accordance with the dial number optionally settable, characterized in that the circuit is connected with a predetermined second called station (telephone for conversation) by the automatic dial apparatus (e) after the completion of the image data transmission by the circuit connection with the first called station (the facsimile apparatus on the side of the receiver) through the facsimile apparatus (f), the voice message are transmitted to the second called station by the voice composition information inputted in advance by the voice input apparatus (a).

The transmission informing system in the facsimile apparatus of the present invention of such construction as described hereinabove is capable of notifying the other party, in accordance with the voice information inputted optionally in advance, that the telephone on the desk of the person in charge on the side of the reception has been automatically called after the facsimile transmission to make the facsimile transmission so as to remove the role by the person in charge on the side of the transmission for the confirmation operator.

It is to be noted that in one embodiment of the present invention, the voice input apparatus a and the voice analysis coding apparatus (b) are omitted. This system is capable of notifying the other party, by voice, that the telephone on the desk of the person in charge on the side of the reception has been automatically called after the facsimile transmission to make the facsimile transmission so as to remove the role by the person in charge on the side of the transmission for the confirmation operator.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
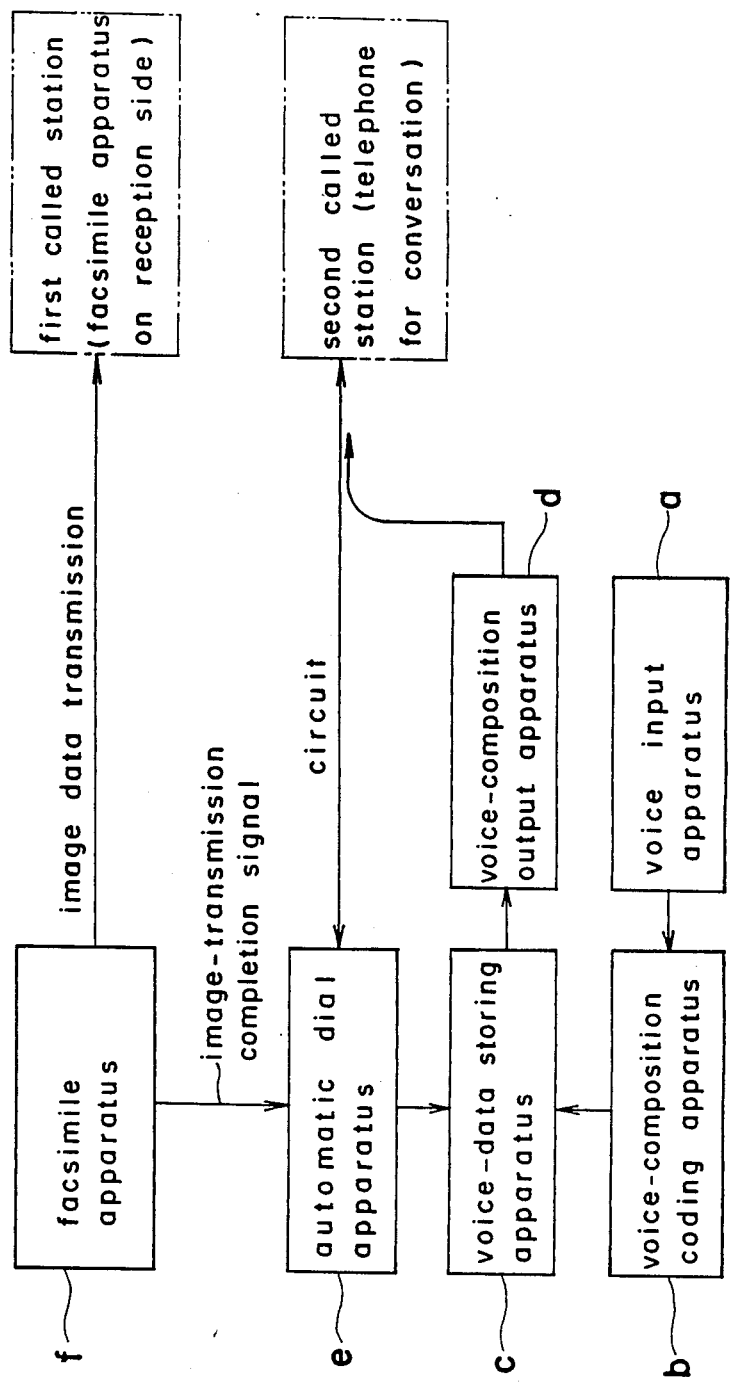
FIG. 1 is a basic conception diagram showing the construction of the present invention.

Before the description of the present invention proceeds, it is to be noted that like parts are designated by like reference numerals throughout the accompanying drawings.

Figure 2:
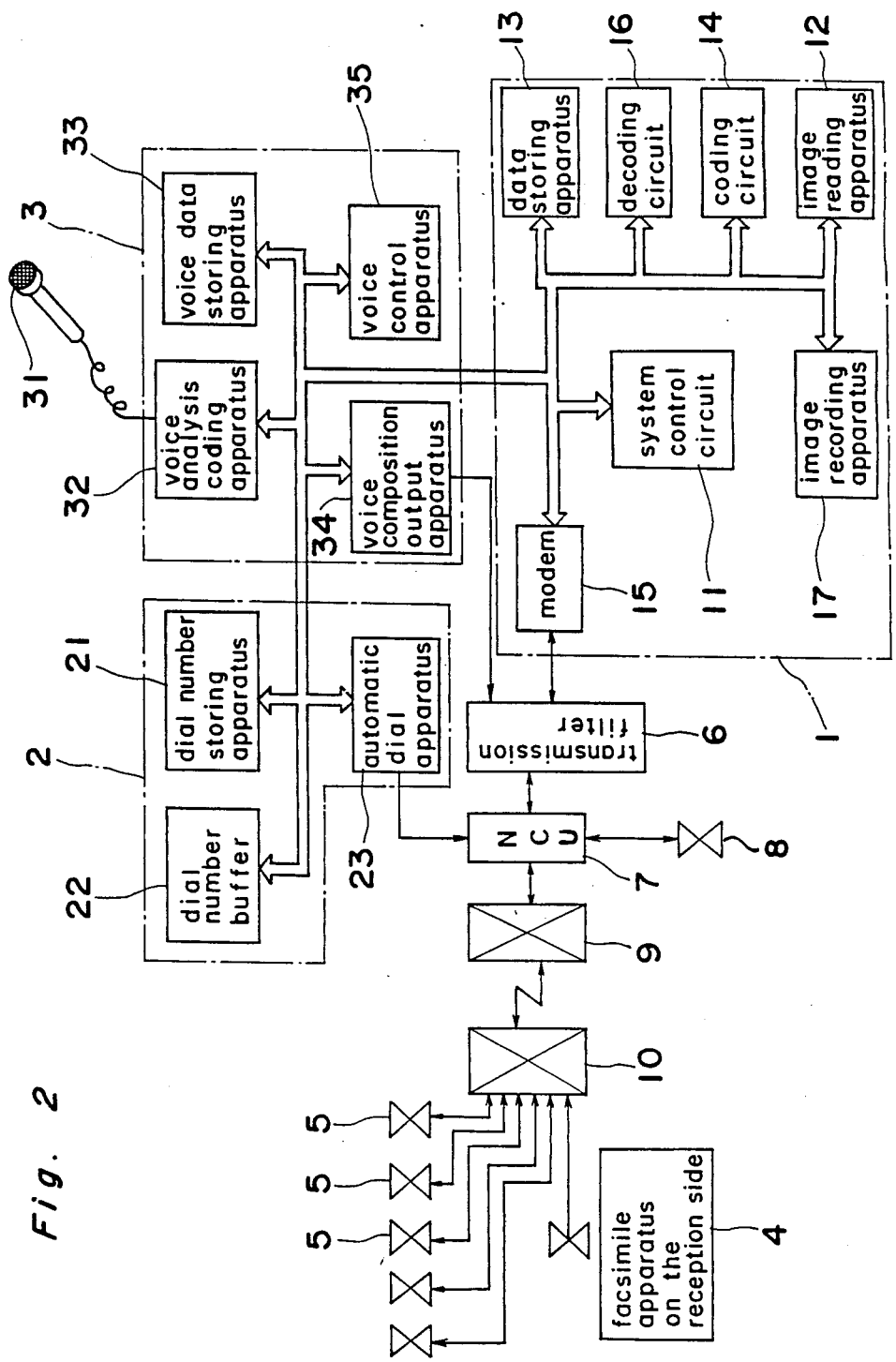
FIG. 2 is a block diagram showing the system construction in the embodiment of the present invention.

Referring now to the drawings, there is shown in FIG. 2, a block diagram showing the system construction in the embodiment of the present invention. This apparatus is composed of a facsimile apparatus 1, an automatic dial unit 2 and a voice producer 3, including a transmission filter 6, a net control unit (NCU) 7, and a telephone on the side of the transmission to be connected with the facsimile apparatus 1 and so on. The facsimile apparatus 4 on the side of the reception which is the first called station and the telephones 5 ... 5 for conversation of the receiving party which is the second called station are connected as described later through the exchange unit 9 on the side of the transmission and the exchange unit 10 on the side of the reception.

The facsimile apparatus 1 which is known is composed of a system control circuit 11 for controlling the whole system, an image reading apparatus 12, a data storing apparatus 13 for storing the reading data, a coding circuit 14 for coding the stored contents, a modem 15 for modulating the coded data during the transmission and demodulating during the reception, a decoding circuit 16 for decoding the data coded by the apparatus on the side of the other party during the reception, an image recording apparatus 17 for recording the reception data, and so on.

The automatic dial unit 2 is provided with a dial number storing apparatus 21 with a plurality of second called-station telephone numbers being accommodated in advance, a dial number buffer 22 for temporarily storing the number information through the selection of the desired number by the transmitting person from among a plurality of telephone numbers stored, and an automatic dial apparatus 23 for transmitting the dial signals through the net control apparatus 7 in accordance with the telephone-number information to be fed from the dial-number buffer 22 by the instructions from the above-described system control circuit 11 to connect the circuit with the corresponding telephone 5.

Also, the voice producing unit 3 is provided with a microphone 31 for inputting voice message, a voice analysis coding apparatus 32 for digitally converting the voice analog signal inputted from the microphone 31 for inputting the voice message and performing a sampling operation for abstracting the voice parameters to do a linear estimate coding operation, a voice data storing apparatus 33 for storing the coded code, a voice composition outputting apparatus 34 for composing the storing contents to make them vocal, and a voice control circuit 35 for controlling each of these apparatuses.

The operation of the embodiment will now be described.

Figures 3A, 3B:
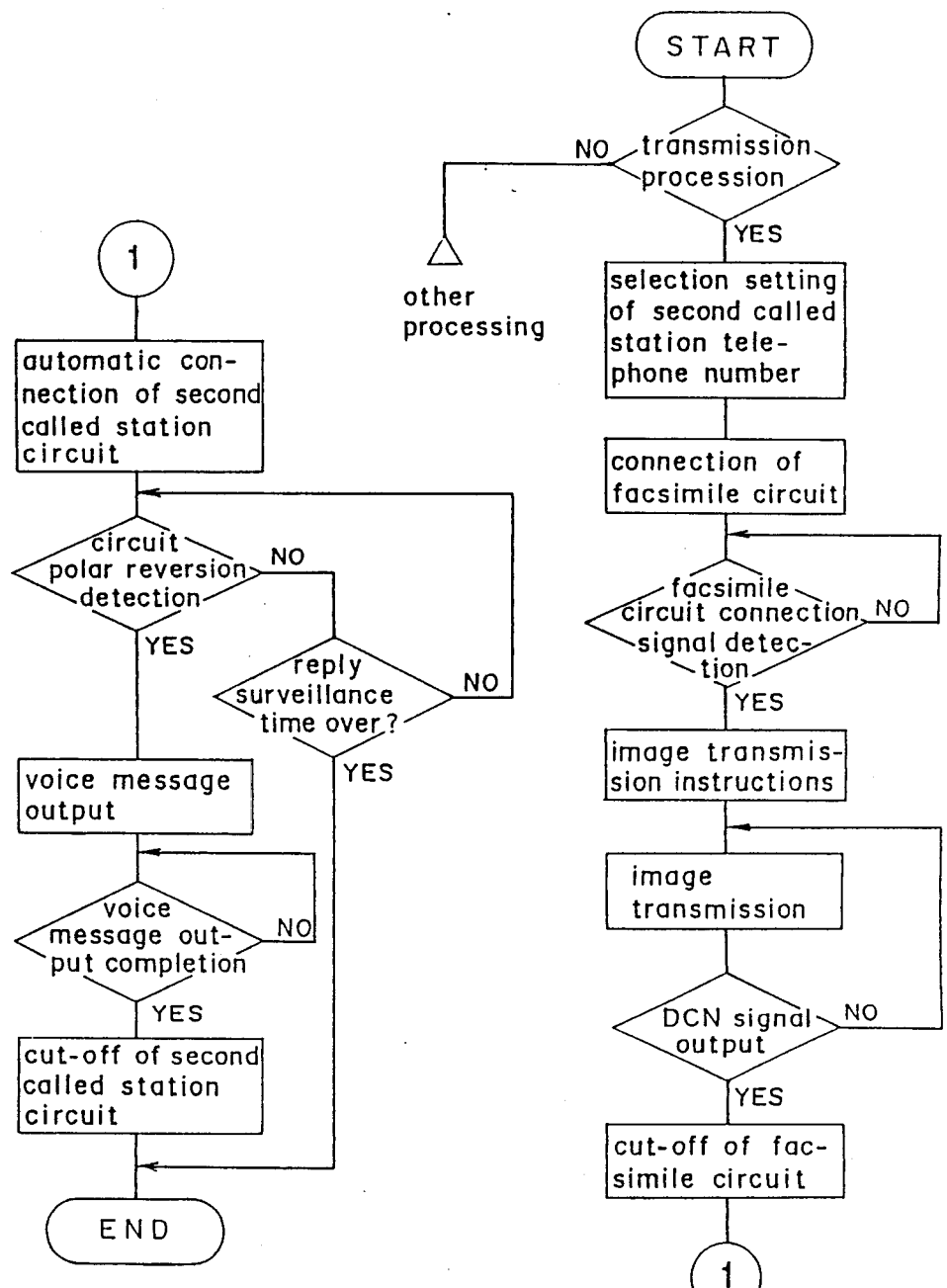
FIGS. 3A and 3B are flow-charts showing the operation procedure of the system by the system controlling circuit 11.

FIGS. 3A and 3B comprise a pair of flow-charts showing the operation procedure of the system by the system control circuit 11.

The sender selects, first, the telephone numbers of the persons in charge to be notified of the facsimile transmission-destination from among the second called-station telephone numbers stored in the dial-number storing apparatus 21, and sets them. Then, the telephone number of the other facsimile apparatus 4, the first called station which should transmit the image data is inputted by the telephone 8 on the side of the transmitter. The inputted telephone-number information is fed to the exchange machine 9 on the side of the transmission through the net control apparatus 7 to open the circuit with the exchange machine 10 on the side of the transmission so that the facsimile apparatus 1 is connected with the facsimile apparatus 4 on the side of the reception. At this time, the facsimile apparatus 4 on the side of the reception transmits, for example, tone signals of 2100 Hz back to the facsimile apparatus 1 on the side of the transmission to notify that the called station is the facsimile terminal. When the transmitting person gives the transmission order through the reception of the tone signal, the image data is accumulated in the data storing apparatus 13 after the image reading of the manuscript by the image reading apparatus 12, the photoelectric conversion, the binary conversion and so on. It is fed into modem 15 after data compression by the coding circuit 14, and is coupled into the circuit through the transmission filter 6 and the net control apparatus 7.

The facsimile apparatus 4 on the side of the reception sequentially records the image data the signals as it is received by the decoding circuit and the image record apparatus.

After such image data transmission as described hereinabove is finished, namely, the reading of the manuscript is completed the facsimile apparatus 1 on the side of the transmission transmits the DCN or disconnect signals to notify a facsimile apparatus 4 on the reception side of the facsimile transmission completion to close the facsimile circuit. After the DCN signal has been transmitted, the second called station telephone-number information initially stored in the dial number buffer 22 is fed into the automatic dial apparatus 23 to transmit the dial number in accordance with the information through the net controlling circuit 7 so as to open the circuit with the corresponding telephone 5 by each of the exchange machines 9, 10. After the polarity inversion detection (confirmation of the other-party response) of the circuit, the voice data previously stored through the microphone 31 in the voice data storing apparatus 33 are fed under the control of the voice control circuit 35. Voice messages of, for example, "This is ABC company. We have just sent a facsimile transmission, will you please confirm it?"; "This is Mr. Smith. We have sent you a facsimile transmission, will you please go and retrieve it at once?" or the like transmitted to the circuit through the transmission filter 6, the net control apparatus 7 to output them to the second called station telephone 5. And when the output of the message is completed, the second calling circuit is cut off to complete the transmitting operation.

As described in the above embodiment, the message transmission system in the facsimile apparatus of the present invention is capable of automatically notifying a receiving party after a facsimile transmission that a transmitting operation has been performed by means of a message which can be optionally inputted in advance through a telephone machine thus removing the confirming operation after the transmission by the person in charge of the transmission, so that the manual participation in the facsimile transmission may be reduced more.

Also, as the modified embodiment of the present invention, the microphone 31 and the voice composition output apparatus 34 may be omitted in, for example, the block diagram of FIG. 2. The circuit with the corresponding telephone 5 is opened by each of the exchange machines 9, 10. After the polarity inversion detection (confirmation of the other-party response) of the circuit, to voice data to stored previously in the voice data storing apparatus 33 are fed under the control of the voice circuit 35. The voice messages of, for example, "This is ABC company. As we have just performed a facsimile transmission, will you please confirm it?" or the like are transmitted to the circuit through the transmission filter 6, the net control apparatus 7 to output them to the second called station telephone 5. And when the output of the message is completed, the second calling circuit is cut off to complete the transmitting operation.

It is to be noted that the voice producer 3 may be composed of a tape recorder and so on.

As is clear from the foregoing description, according to the arrangement of the present invention, the present invention may notify that a facsimile transmitting operation has been automatically performed through the telephone for conversation of the transmitting party after the facsimile transmission so that the confirmation communicating operation after the transmission by the person is not required, thus further reducing the manual participation in the facsimile transmission.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A stored voice data transmission informing system in a transmitting facsimile apparatus connected to a first called station for automatically calling the receiving party over a second called station for confirming that a facsimile transmission has been sent comprising:

a voice data storing apparatus, a voice composition output apparatus for generating a voice message coupled to said storing apparatus, and automatic dialing apparatus for automatically connecting said output apparatus with the second called station after the transmission completion of image data from said facsimile apparatus connected to the first called station, and wherein voice data stored in said voice data storing apparatus is transmitted as a voice message to said second called station by said voice output apparatus.

2. A transmission informing system in a transmitting facsimile apparatus connected to a first called station for notifying an intended receiver over a second called station of the completion of a facsimile transmission comprising:

a voice input apparatus for inputting predetermined voice information from an external source, voice analysis coding apparatus for analyzing and coding the inputted voice information as voice data, voice data storing apparatus for storing the coded voice data, voice composition output apparatus for composing an output voice message in accordance with the stored voice data and an automatic dialing apparatus for automatically connecting said output apparatus with the second called station after the transmission completion of image data from said facsimile apparatus connected to the first called station, and wherein the voice message is transmitted to the second called station by said voice composition output apparatus.

3. The system as defined by claim 2 wherein said first and second called stations comprise telephone stations.

4. The system as defined by claim 3 and wherein said automatic dialing apparatus comprises automatic telephone dialing apparatus including means for storing at least one second station called telephone number.

* * * * *